(12) United States Patent
Garcia Reyero Vinas et al.

(10) Patent No.: US 10,661,506 B2
(45) Date of Patent: May 26, 2020

(54) INDEXING CELLS OF N-DIMENSIONAL OBJECTS

(71) Applicant: HEWLETT-PACKARD DEVELOPMENT COMPANY, L.P., Houston, TX (US)

(72) Inventors: Juan Manuel Garcia Reyero Vinas, Sant Cugat del Valles (ES); Utpal Kumar Sarkar, Sant Quirze del Valles (ES); Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 57 days.

(21) Appl. No.: 15/540,343

(22) PCT Filed: Feb. 5, 2015

(86) PCT No.: PCT/EP2015/052433
§ 371 (c)(1),
(2) Date: Jun. 28, 2017

(87) PCT Pub. No.: WO2016/119907
PCT Pub. Date: Aug. 4, 2016

(65) Prior Publication Data
US 2017/0361536 A1 Dec. 21, 2017

(30) Foreign Application Priority Data

Jan. 30, 2015 (WO) ................ PCT/EP2015/051869

(51) Int. Cl.
*B29C 64/393* (2017.01)
*G06T 17/00* (2006.01)
(Continued)

(52) U.S. Cl.
CPC ............ *B29C 64/393* (2017.08); *B33Y 50/02* (2014.12); *G05B 19/4099* (2013.01);
(Continued)

(58) Field of Classification Search
None
See application file for complete search history.

(56) References Cited

U.S. PATENT DOCUMENTS 6,429,864 B1 8/2002 Schwarzer
6,577,310 B1 * 6/2003 Kim ........................ G06T 9/001
345/420
(Continued)

FOREIGN PATENT DOCUMENTS

CN 104167021 B * 5/2015
WO WO0135341 5/2001

OTHER PUBLICATIONS

David ("Advanced Octrees 2: node representations", https://geidav.wordpress.com/2014/08/18/advanced-octrees-2-node-representations/) (Year: 2014).*
(Continued)

*Primary Examiner* — Xin Sheng
(74) *Attorney, Agent, or Firm* — HP Inc. Patent Department

(57) ABSTRACT

Cells of an n-dimensional object are indexed. A plurality of indexing digits are grouped for each axis of the n dimensions of the n-dimensional object. A first indexing digit of a given group is allocated to each of at least two cells resulting from at least one subdivision of the dimension of the object along the axis of the given group; and an $m^{th}$ subsequent indexing digit of the given group is allocated to any subsequent at least two cells resulting from any subsequent at least one subdivision of at least one cell of the at least two cells (Continued)

resulting from the m−1$^{th}$ subdivision of the dimension of the object along the axis of the given group.

17 Claims, 10 Drawing Sheets

(51) Int. Cl.
*B33Y 50/02* (2015.01)
*G05B 19/4099* (2006.01)
*G06T 15/20* (2011.01)

(52) U.S. Cl.
CPC .......... *G06T 15/205* (2013.01); *G06T 17/005* (2013.01); *G05B 2219/35134* (2013.01); *G05B 2219/49007* (2013.01)

(56) References Cited

U.S. PATENT DOCUMENTS

| | | |
|---|---|---|
| 6,778,173 B2 | 8/2004 | Han et al. |
| 8,014,568 B2 | 9/2011 | Lojewski |
| 8,358,303 B2 | 1/2013 | Kim et al. |
| 2012/0191723 A1* | 7/2012 | Salemann ......... G06F 17/30241 707/741 |

OTHER PUBLICATIONS

Frisken, et al; "Simple and Efficient Traveral Methods for Quadtrees and Octrees"; Nov. 2002; pp. 1-13; http://www.merl.com/publications/docs/TR2002-41.pdf.

Castro, et al; "Statistical Optimization of Octree Searches"; Computer Graphics Forum; vol. 27, No. 6; 2008; pp. 1557-1566; http://www.matmidia.mat.puc-rio.br/tomlew/pdfs/octree_cgf.pdf.

Keeter; "Hierarchical Volumetric Object Representations for Digital Fabrication Workflows"; Jun. 2013; pp. 1-114; http://cba.mit.edu/docs/theses/13.05.Keeter.pdf.

Meyer, et al; "Segmentation and Texture-Based Hierarchical Rendering Techniques for Large-Scale Real-Color Biomedical Image Data"; Jun. 27, 2002.

* cited by examiner

INDEXING CELLS OF N-DIMENSIONAL OBJECTS

BACKGROUND

In processing data representing n-dimensional objects, for example in processing 2D image data for printing a 2D image or processing a 3D object model for generating a 3D object by 3D printing, control data is generated based on the properties of the n-dimensional object which is provided to a device, such as a printing device, to provide the appropriate commands to the device to generate the 2D image or the 3D object

BRIEF DESCRIPTION OF DRAWINGS

For a more complete understanding, reference is now made to the following description taken in conjunction with the accompanying drawings in which.

DETAILED DESCRIPTION

Figure 1:
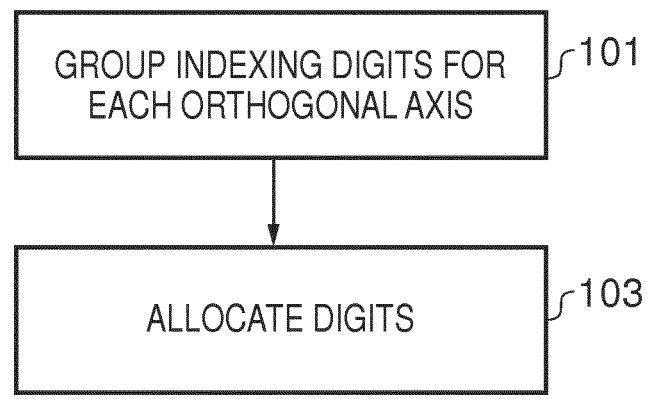
FIG. 1 is a flowchart of an example of a method for indexing cells of an n-dimensional object.

In processing data representing n-dimensional objects, for example in processing 2D image data for printing a 2D image or processing a 3D object model for generating a 3D object by 3D printing, control data is generated based on the properties of the n-dimensional object which is provided to a device, such as a printing device, to provide the appropriate commands to the device to generate the 2D image or the 3D object.

Additive manufacturing systems that generate 3D objects on a layer-by-layer basis have been proposed as a potentially convenient way to produce 3D objects.

Additive manufacturing techniques may generate a 3D object through the solidification of a build material. The build material may be powder-based and the properties of generated objects may depend on the type of build material and the type of solidification mechanism used. In a number of examples of such techniques build material is supplied in a layer-wise manner and the solidification method includes applying energy to the layers of build material to cause coalescence, or melting, in selected regions. In other techniques, chemical solidification methods may be used.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified by the additive manufacturing system.

The 3D object may also be defined by its property data in which portions of the 3D object have differing properties such as color, rigidity/flexibility, conductivity, magnetism, opacity, porosity, etc. These portions may need combinations of different materials with the build material. Equally 2D object (images) may also be defined by areas having differing properties, such as color or opacity, for example, which use different printing fluids and/or combinations thereof in these areas.

Different portions of the 2D or 3D object models may be defined at different resolutions. For example, 3D object models may have high detail surface areas that are represented using high-resolution voxel information, and low detail areas that may be represented at a lower resolution. Using a uniform grid to represent all voxels may not be practicable, for example in the order of $10^9$ voxels for a single cubic inch would be needed.

More efficient approaches of representing object properties, like octrees, rely on a tree structure implementation that is not efficient for tasks such as finding intersections with planes. They are also not particularly well suited which may be less suited for high-speed processing.

An octree is a tree-based representation of a cuboid-shaped volume in which each edge is divided in two equal parts, thus dividing the cuboid in eight. This process may be applied recursively, until the desired resolution is reached at each location. An octree can be represented as a tree in which each node has 8 branches.

However, in the examples below, use of a full tree implementation to index cells of an n-dimensional object is not necessary. As shown in FIG. 1, in one example, the cells of an n-dimensional object, where n is an integer greater than 1 are indexed. The cells of the n-dimensional object where each cell has n dimensions and at least one dimension of each cell formed by at least one subdivision of at least one dimension of the n-dimensional object may be indexed by grouping, 101, a plurality of indexing digits for each axis of n dimensions of an n-dimensional object. In the examples described herein, the plurality of indexing digits are grouped for each orthogonal axis of n dimensions. In addition, the plurality of indexing digits may be grouped for any set of axes of the n-dimensional object, as long as they are not degenerate (i.e., their determinant is not zero). A first indexing digit of a given group is allocated, 103, to each of at least two cells resulting from at least one subdivision of the dimension of the object along the axis of the given group and an $m^{th}$ subsequent indexing digit of the given group to any subsequent at least two cells resulting from any subsequent at least one subdivision of at least one cell of the at least two cells resulting from the $m-1^{th}$ subdivision of the dimension of the object along the axis of the given group is also allocated, 103. The allocated digits may be output in the order of their groups to provide an index for each cell of an input n-dimensional object.

Figure 2A:
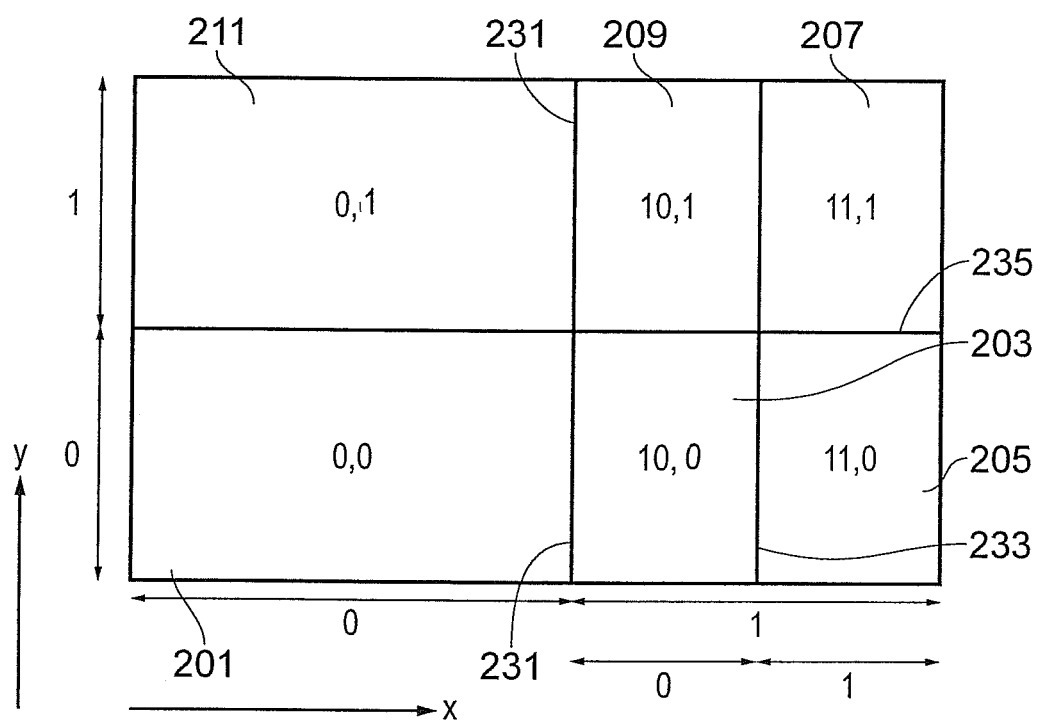
FIG. 2*a* is a representation of an example of indexed cells of a 2D object.

As shown for a 2D object in FIG. 2*a*. The 2D object has 2 orthogonal axes (x and y). In the dimension of the x axis, the 2D object has a first subdivision 231, and a second subsequent subdivision 233 of one of the cells formed by the first subdivision and one subdivision 235 of the dimension along the y-axis to form 6 2D cells 201, 203, 205, 207, 209, 211. Each cell is indexed by first grouping the indexing digits of the x-axis and allocating to each cell of the first subdivision 231, a first indexing digit 0 or 1 and allocating for each cell resulting from the second subsequent subdivision 233, m=2, a second indexing digit 0 or 1. Therefore each cell is indexed as follows: cell 201 has the index 0, 0; cell 203 10, 0; cell 205 11, 0; cell 207 11, 1; cell 209 10, 1 and cell 211 0, 1.

Figure 2B:
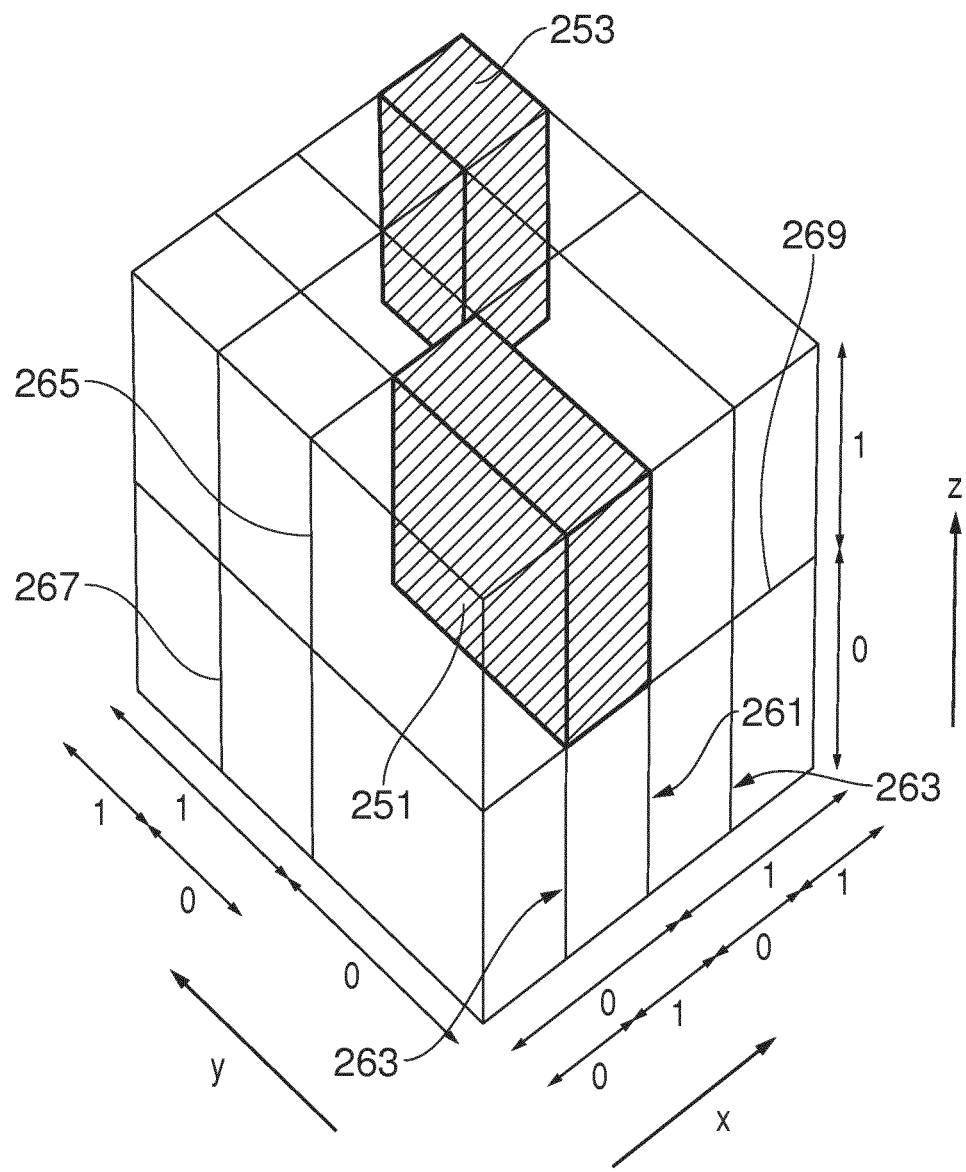
FIG. 2*b* is a representation of an example of indexed cells of a 3D object.

An example of indexing a 3D object model is illustrated in FIG. 2b. The 3D object has 3 orthogonal axes (x, y and z). In the dimension of the x-axis, the 3D object has a first subdivision 261, and two second subsequent subdivisions 263 of each of the two cells formed by the first subdivision 261. In the dimension of the y-axis, the 3D object has a first subdivision 265 and a second subdivision 267 of one of the two cells formed by the first subdivision 265 of the dimension along the y-axis and a first subdivision 269 of the dimension of the 3D object along the z axis to form 24 3D cells. In an example, each cell is indexed by first grouping the indexing digits of the x-axis and allocating to each cell of the first subdivision 261, a first indexing digit 0 or 1 and allocating for each cell resulting from the two second subsequent subdivision 263, m=2, of each of the cells formed by the first subdivision, a second indexing digit 0 or 1. A second group of indexing digits for the y-axis are allocated such that a first indexing digit (0 or 1) of a second group is allocated to the two cells resulting from the first subdivision 267 and a second indexing digit (0 or 1) is allocated to the two cells resulting from the second subdivision 267 of one of the cells resulting from the first subdivision 265 and a first indexing digit of a third group is allocated to the two cells resulting from the first subdivision 269 along the z-axis. In the example shown in FIG. 2b, cell 251 is allocated the index 01, 0, 1 and the cell 253 has the allocated index 11, 11, 1.

In FIGS. 2a and 2b binary indexing digits were allocated to cells as each subsequent subdivision forms two cells of the previous subdivision. In the example shown in FIG. 2c, non-binary indexing digits are utilised.

Figure 2C:
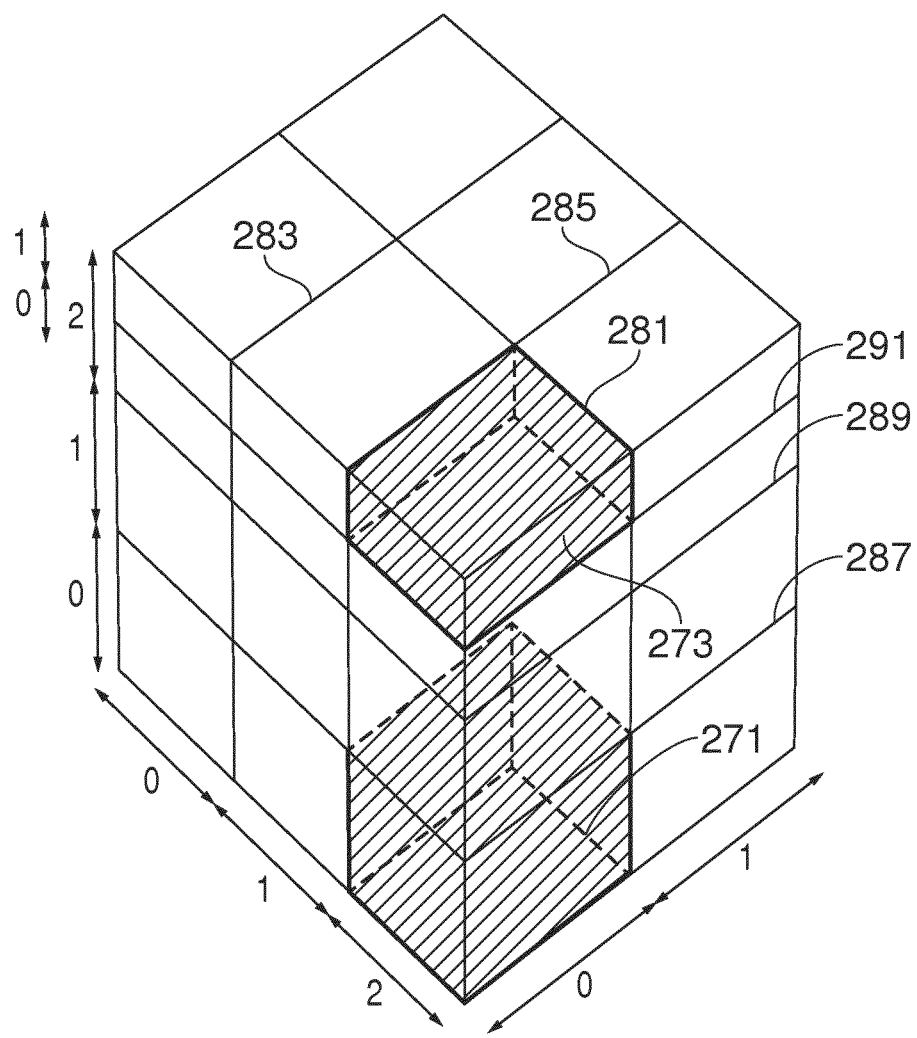
FIG. 2*c* is a representation of another example of indexed cells of a 3D object.

In the example of FIG. 2c, a 3D object is represented having dimensions of the x, y and z-axes. In the example, the x-axis has a first subdivision 281, the y-axis has two first subdivisions 283, 283 and the z-axis has two first subdivisions 287, 289 and a second subdivision 291. In the example, cell 271 is allocated the index 0, 2, 0 and cell 273 is allocated the index 0, 2, 21.

In the processing of the n-dimensional objects, for example, the 2D object of FIG. 2 and the 3D objects of FIGS. 2b and 2c, the indexing of the cells provides easy encoding of data associated with the cells, for example, property data. Properties or printing attributes for each indexed cell can then be used to generate control data and the control data can be indexed by the allocated indexes to process the correct corresponding cell in the printed object.

Figure 3:
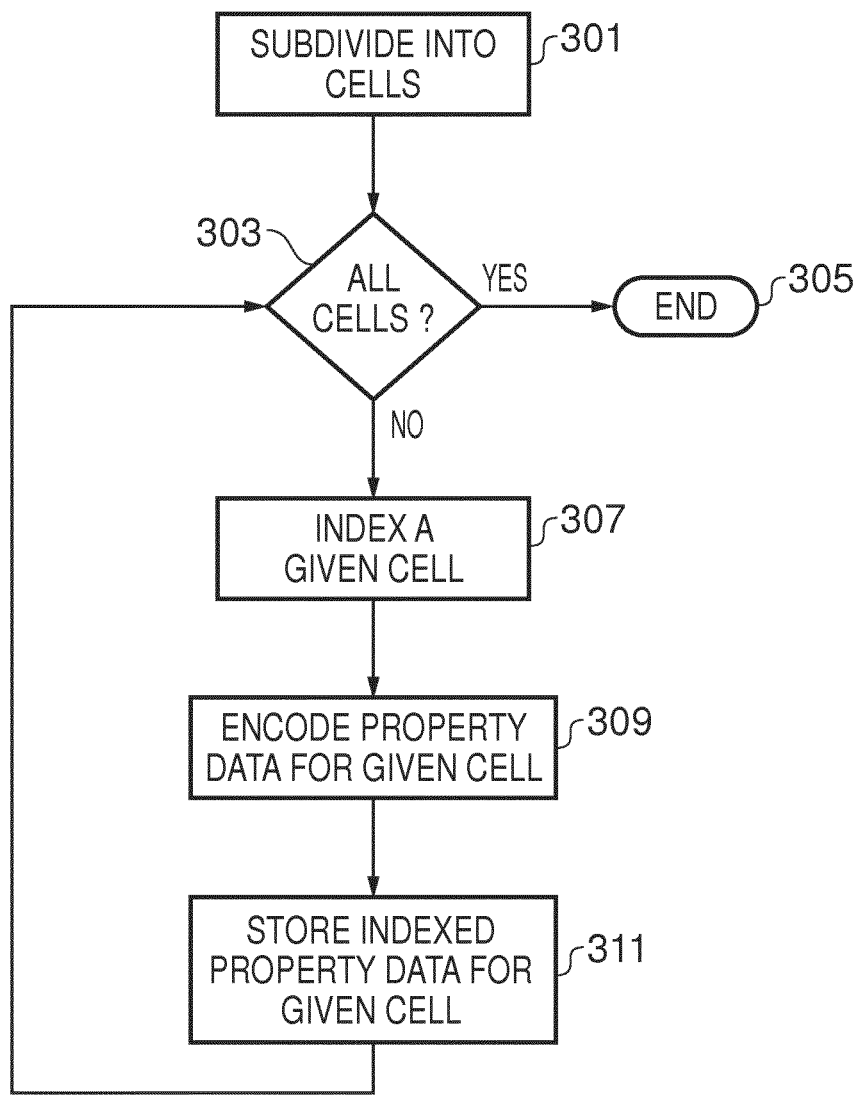
FIG. 3 is a flowchart of an example of a method for processing an n-dimensional object.
Figure 4:
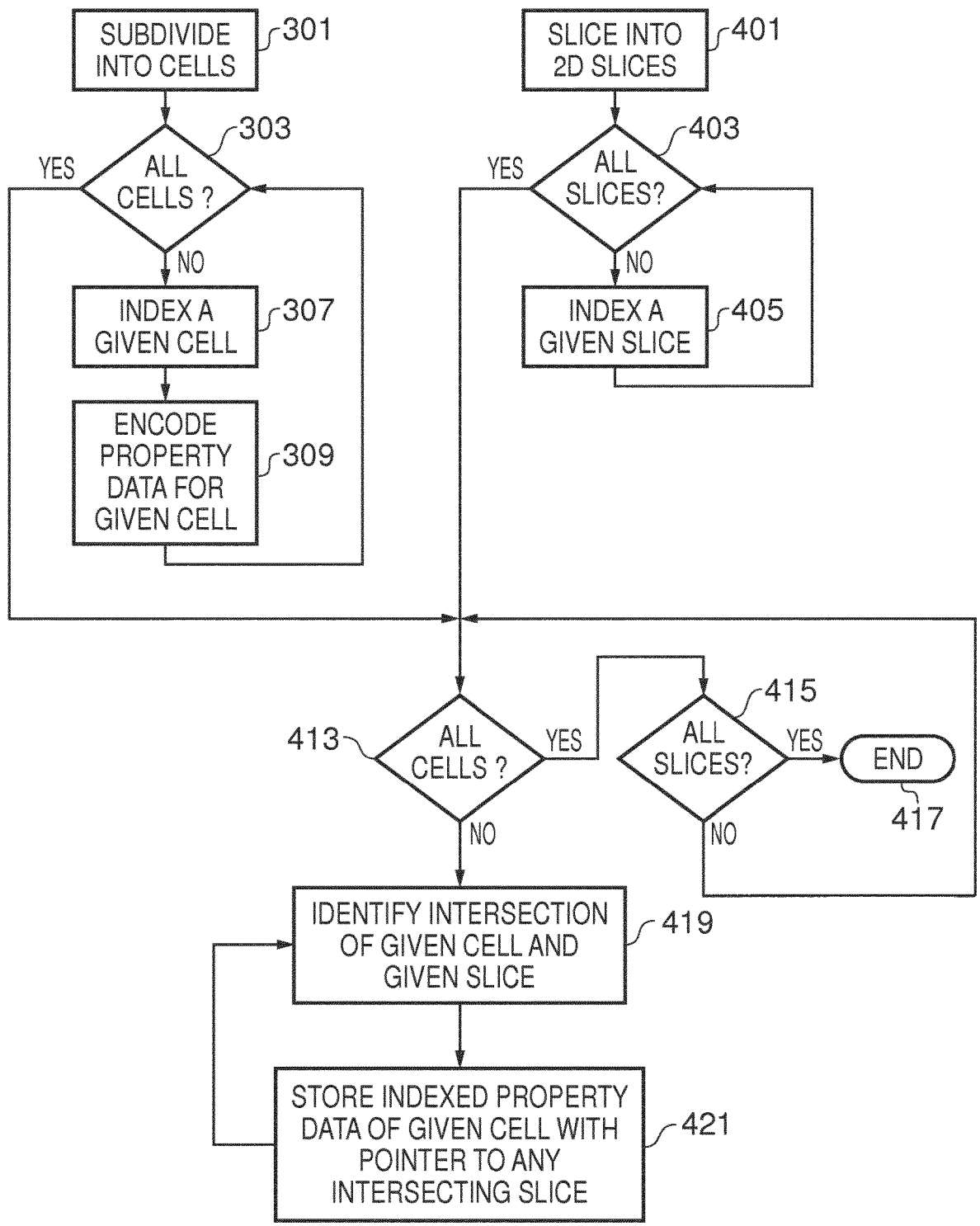
FIG. 4 is a flowchart of an example of a method for encoding property data of a 3D object.

In one example an n-dimensional object may be processed for printing as shown in FIG. 3. The input n-dimensional object (2D image or representation of a 3D object to be printed) is subdivided, 301, into a plurality of cells. The n-dimensional object may be subdivided based upon the properties of the printed object, for example, properties such as opacity, rigidity, conductivity, magnetism. The n-dimensional object may be subdivided so that each cell has a different property and/or resolution associated therewith to that of its neighbouring cells. All the cells, 303, 307 are indexed. Each cell is indexed by grouping a plurality of indexing digits for each orthogonal axis, allocating a first indexing digit of a given group to each of at least two cells resulting from at least one subdivision of the dimension of the object along the axis of the given group, and allocating an $m^{th}$ subsequent indexing digit of the given group to any subsequent at least two cells resulting from any subsequent at least one subdivision of at least one cell of the at least two cells resulting from the m−$1^{th}$ subdivision of the dimension of the object along the axis of the given group as described with reference to FIGS. 1, 2a, 2b and 2c.

Property data of each cell is then encoded, 309, for each cell and is indexed using the allocated indexing digits and this data may be stored, 311, for later reference for generating print control data, for example. Once all cells have been processed, the process ends 305. The allocated indexing digits provide the details of the cell needed to define the property data at the resolution for generating the print control data.

In one example, a 3D model may be processed according to information on the desired properties associated with each cell (sub-volumes). For example, the bottom half of the interior of a 3D object might be processed so that it has low density, while the top half might be processed for high density. The indexing described above allows the creator of the model to specify the properties of sub-volumes (or cells) at any resolution and in an efficient way as opposed to setting properties to all high-resolution voxels which would be too inefficient to be usable.

The indexing of the property data is memory-efficient which can be efficiently processed as the property data is defined at cellular level and the subdivision can be varied to take into account differing resolutions of the property data. Therefore, the indexing described above enables multiple resolutions. It allows fast processing. The indexing of the property data can be used to store 2D image data or 3D object model data in files, and easily transfer information about 2D images or 3D object models to a 3D printer.

Intersecting with the XY, YZ and ZY planes is a very common task to be performed with volume-based data. In one example, for example as shown in FIGS. 4, 5a, 5b and 5c intersection of a given cell of the 3D volume of the 3D object with a given slice (target plane) of the 3D object is identified. In another example, a given location of a given slice of a 3D object may be determined by finding the intersection of two planes, or, at least, a combination of these examples.

As described with reference to FIG. 3 above, the property data of a cell is encoded and indexed according to the indexing allocated to a given cell. A 3D representation of the 3D object to be generated is sliced, 401, to generate a plurality of parallel 2D slices. Each slice, 403, is indexed, 405. The slices are indexed by allocating indexing digits for the axis orthogonal to the plane of the 2D slice in a similar manner to that of indexing cells. For example, the slice 501 of the 3D object of FIG. 5a is such that the x-axis is orthogonal to the plane of the slice and, following the examples of FIGS. 1, 2a, 2b and 2c above, the slice 501 is allocated the indexing digits 0.

The intersection is then identified, 419 for each cell, 413 and each slice, 415. Once all cells and slices have been processed, the process ends, 417. In storing, 421, the property data of the 3D object, a mere pointer to the intersecting slice can be provided for the intersecting, indexed cell.

The identification of the intersecting cell and slice is simplified by using of the allocated indexing of the cells and the indexing of the slice.

Figure 5A:
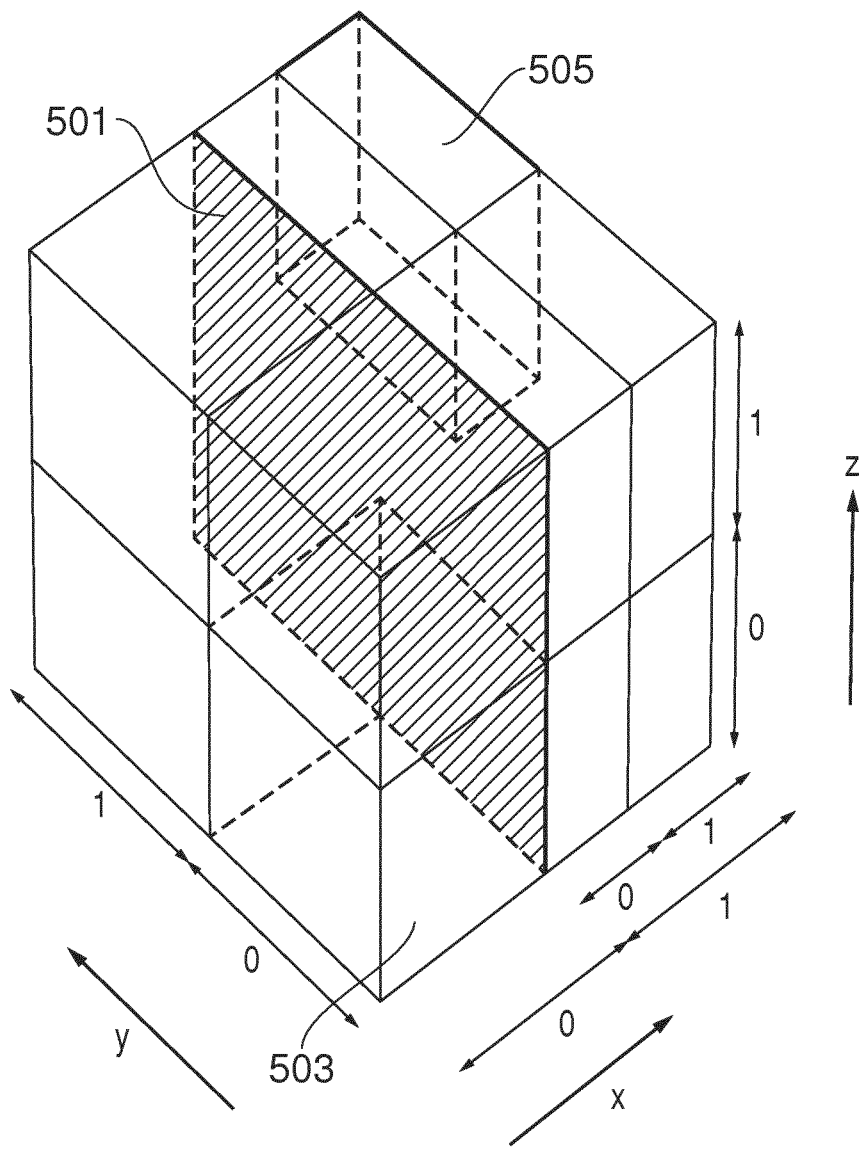
FIG. 5*a* is a representation of an example of indexed cells and intersecting plane of a 3D object.

In the example of FIG. 5a, cell 503 has the allocated index 0, 0, 0. As the axis orthogonal to the slice 501 is the x-axis the index of the slice 501 the corresponding number of digits of the first group of the cell index are compared with the slice index. In this example, the corresponding first digit of the first group is compared to the slice index. If the index of slice 501 and the corresponding digits of the first group of allocated cell index coincide that the slice 501 intersects. As shown in FIG. 5a, the slice 501 intersects the cell 503.

Consider the cell 505 which is allocated the index 11, 1, 1. Comparing the first digit of the first group of the allocated cell index, this is not the same as the index for the slice 501 and as shown in FIG. 5a, the cell 505 does not intersect the slice 501.

Figure 5B:
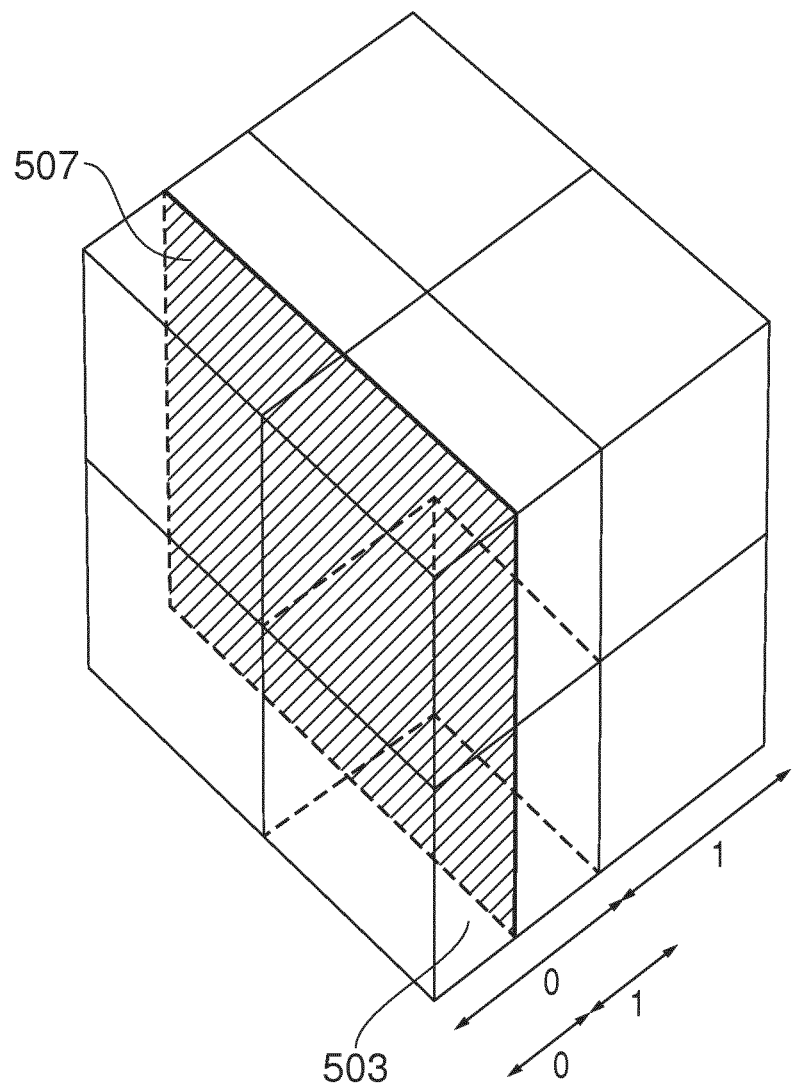
FIG. 5*b* is a representation of another example of indexed cells and intersecting plane of a 3D object.

In the example of FIG. 5b, the cell 503 has the allocated index 0, 0, 0 and the slice 507 has the index 00. The corresponding digits of the slice index are compared to the corresponding digits of the first group of the cell index. In this example, the first digit of the slice index is compared with the first digit of the first group of the cell index. As these digits are the same, slice 507 intersects the cell 503.

Figure 5C:
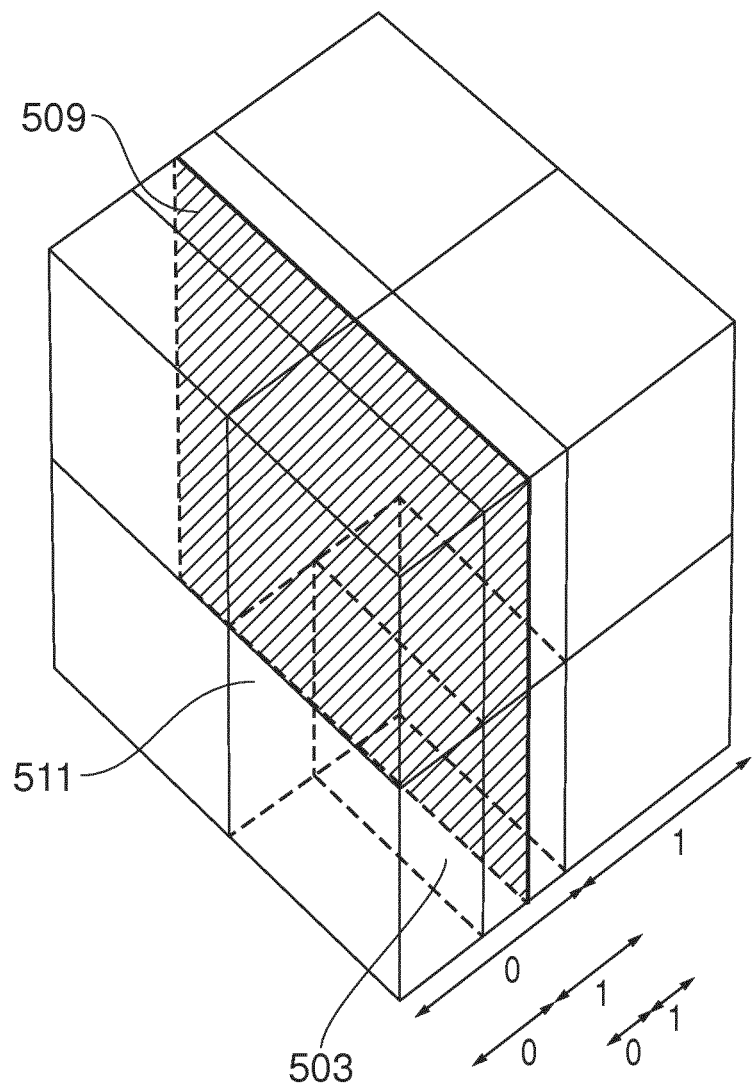
FIG. 5*c* is a representation of yet another example of indexed cells and intersecting plane of a 3D object.

In the example of FIG. 5c, the cell 503 has the allocated index 0, 0, 0 and the slice 509 has the index 010. The first digit of the slice index is compared to the first digit of the first group of the cell index and as these are the same, slice 509 intersects the cell 503.

Now consider the cell 511 of FIG. 5c which has the allocated index 00, 0, 0. The digits of the first group of the allocated cell index are compared with the corresponding digits of the slice index, namely the first and second digits of the slice index are compared with the first and second digits of the first group of the cell index. As these are not the same, the slice 509 does not intersect the cell 511.

The cell index can also be utilised to define a portion of the intersecting slice. In the example shown in FIG. 5a, the portion 513 of slice 501 can be identified by the cell index of the cell 503 as 0, 0 of the slice 501.

Figure 6:
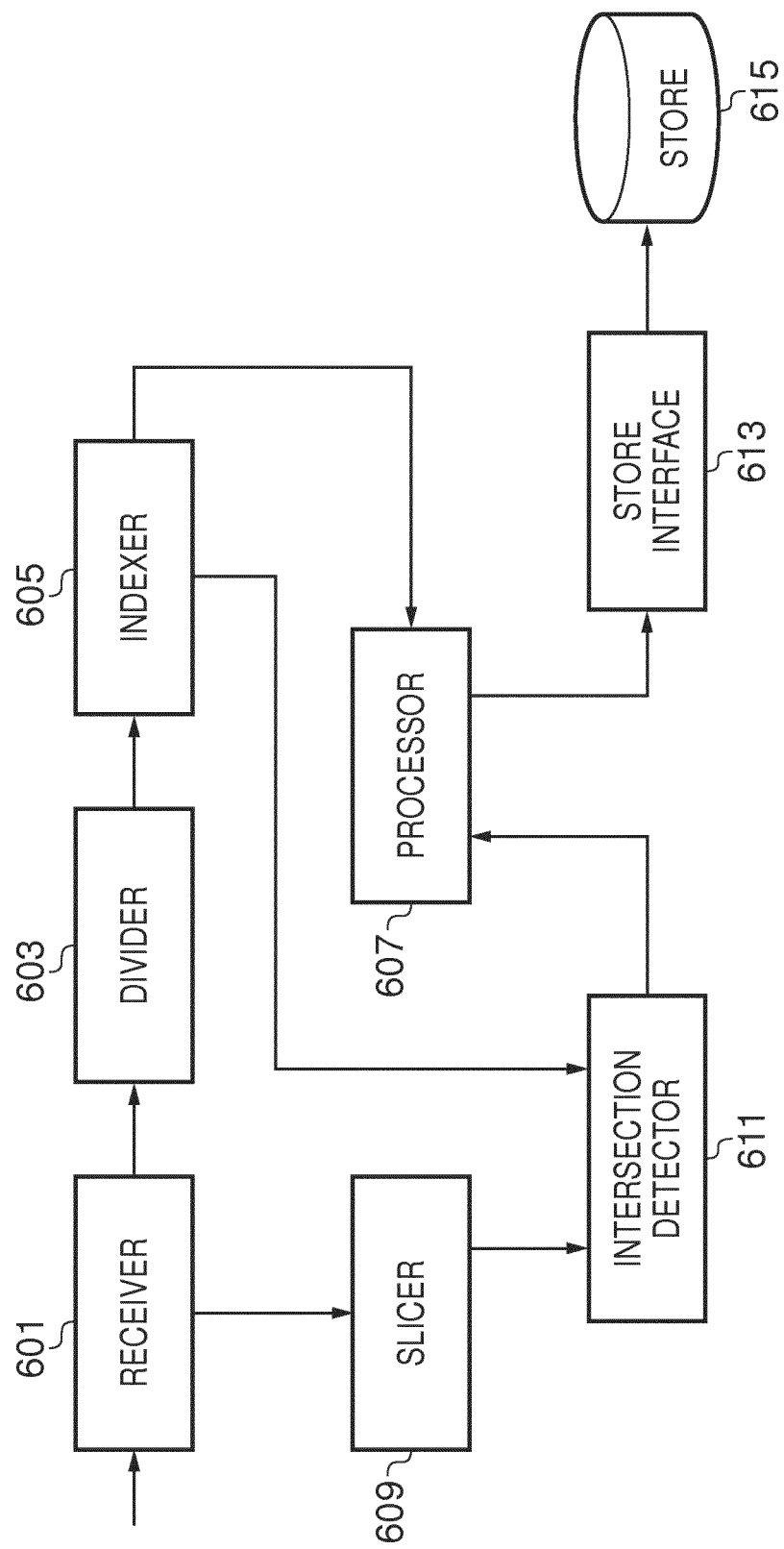
FIG. 6 is a simplified schematic of an example of apparatus for processing a 3D object.

An example of apparatus for processing an n-dimensional object is shown in FIG. 6. The apparatus comprises a divider 603 to subdivide each orthogonal axis of the n dimensions of an n-dimensional object received by the recover 601 to form a plurality of cells. Each cell is formed by at least one subdivision of at least one dimension of the n-dimensional object. The apparatus further comprises an indexer 605 to group a plurality of indexing digits for each orthogonal axis of n dimensions of an n-dimensional object, where n is an integer greater than 1; to allocate a first indexing digit of a given group to each of at least two cells resulting from at least one subdivision of the dimension of the object along the axis of the given group; and to allocating an $m^{th}$ subsequent indexing digit of the given group to any subsequent at least two cells resulting from any subsequent at least one subdivision of at least one cell of the at least two cells resulting from the $m-1^{th}$ subdivision of the dimension of the object along the axis of the given group.

The apparatus further comprises a slicer 609 to slice the input n-dimensional object received by the receiver 601 into a plurality of 2D slice, as described above, and to index each slice as described above.

The apparatus further comprises an intersection detector 611 to identify intersection of a target slice (plane) and the 3D object by allocating a pth indexing digit to a pth subdivision of the axis orthogonal to the target plane; and identifying that the plane intersects a cell if the indexing digits of the group corresponding to the axis orthogonal to the target plane of the index allocated to the cell is the same as the corresponding indexing digits allocated to the target plane. The apparatus further comprises a processor 607 to generate printing control data for each cell of the n-dimensional object and a store interface 613 to access a store 615 to store the printing control data of a given cell indexed by the allocated indexing digits of the given cell. The store 615 may be external to the apparatus.

The indexing of the cells is a very efficient operation. Given a list of indexed cells it is possible to find the subset that intersects a given slice (plane). As the list of indexes are grouped based on the orthogonal axes of each dimension the comparison of indexes to identify the intersections is faster.

If the cell indexes are stored in order of their groups, for example the indexes of all cells of an object corresponding to the z-axis then slicing along this axis becomes a simple matter of keeping two pointers: one for the first cell that intersects with the current slice, and another for the last intersecting cell. Moving to the next slice is simply a matter of sliding the pointers.

Further the property data and it corresponding index can be efficiently stored in memory, defining a hash table indexed with the allocated cell indexes. Good hash implementations allow constant-time access. It can also be used to efficiently serialize the cell index and property data, thus enabling storage in a file format.

Further, storing the property data of the object may be stored in a predetermined order based on the number of digits of at least one group of the indexing digits allocated to a given cell. For example, the propriety data may be stored based on the size of the cell. The larger the number of digits allocated to the cell of a given group would indicate a smaller dimension and hence a smaller cell. This could be used to identify overlapping cells. For example a cell which is fully contained within a larger cell. Each of the cells has a property associated therewith, for example, color. The property of the cells may be in conflict and one way to resolve this conflict would be to select the property of the smaller cell for that of the larger cell. The ordering of the index makes identification of overlapping cells a simple task.

For binary indexing, these may be stored in a variable of a fixed bit length, for example a 32-bit integer, by identifying the actual bit length of the index.

In one example a first 1 bit marks the beginning or the end of the index. In marking the end of the index, for example, in an 8-bit variable containing XXXXX100, where X is any bit, and the first 1 from the end marks where the indexing bits finish. This would leave a maximum of 7 useful bits for encoding (31 for a 32-bit variable).

In another example a binary mask may be used to extract the index bits.

In the examples of using the cells to define properties of an object clearly defined rules can be utilised that gives precedence to the most specific, the smallest, cell affecting a sub-volume. The indexed cells may define empty space and can be efficiently used to approximate a given volume.

The above indexing allows a more compact and computationally efficient representation and slicing of multi-sized, multi-shaped 3D object property data.

The encoding of 2D or 3D model's properties is part of being able to define print control data and hence print the model. Controlling the format used to specify area or volume based properties, and making sure that it is efficient and well suited to the printer's processing capabilities, for example making use of a standard file format to make the printing process more efficient allowing fast processing. In particular, slicing and finding the expected properties of a plane can be extremely fast.

It should be noted that the above-mentioned examples illustrate rather than limit what is described herein, and that those skilled in the art will be able to design many alternative implementations without departing from the scope of the appended claims. The word "comprising" does not exclude the presence of elements other than those listed in a claim, "a" or "an" does not exclude a plurality, and a single processor or other unit may fulfil the functions of several units recited in the claims.

The invention claimed is:

1. A method for indexing cells of an n-dimensional object to be printed, each cell having n dimensions and at least one dimension of each cell formed by at least one subdivision of at least one dimension of the n-dimensional object, the method comprising:
grouping a plurality of indexing digits for each axis of n dimensions of an n-dimensional object, where n is an integer greater than 1;
allocating a first indexing digit of a given group to each of at least two cells resulting from at least one subdivision of the dimension of the object along the axis of the given group;
allocating an $m^{th}$ subsequent indexing digit of the given group to any subsequent at least two cells resulting from any subsequent at least one subdivision of at least one cell of the at least two cells resulting from the $m-1^{th}$ subdivision of the dimension of the object along the axis of the given group;
allocating an indexing digit within the plurality of indexing digits for each axis of n dimensions of an n-dimensional object to encode a property associated with any of the at least two cells, wherein each cell has property data associated therewith and each undivided cell has uniform property data;
sorting groups of the plurality of indexing digits for each axis of n dimensions of the n-dimensional object by indexing digits for a first dimension;
forming slices in the first dimension using the sorted groups; and
providing the slices to an additive manufacturing system for fabrication.

2. The method of claim 1, wherein the indexing digits comprise the values 0 or 1.

3. The method of claim 1, wherein the method further comprises
encoding property data associated with each cell of the n-dimensional object; and
storing the property data of a given cell indexed by the allocated indexing digits of the given cell.

4. The method of claim 3, wherein the storing the property data of a given cell comprises:
storing the allocated indexing digits of a given cell within a variable of fixed bit length, and
inserting at least one marker digit within the variable of fixed bit length to indicate the start and/or end of the allocated indexing digits of the given cell.

5. The method of claim 3, wherein storing the property data of a given cell comprises storing the allocated indexing digits of a given cell within a variable of fixed bit length at a predetermined location such that the allocated indexing digits are extractable by applying a binary mask.

6. The method of claim 3, wherein storing the property data of a given cell comprises storing the property data in a predetermined order based on the number of digits of at least one group of the indexing digits allocated to a given cell.

7. The method of claim 1, wherein the n-dimensional object comprising a 3D object, and grouping a plurality of indexing digits for each axis comprises grouping a plurality of indexing digits for each orthogonal axis of the 3 dimensions of the 3D object, and the method further comprising identifying intersection of a target plane and at least one cell of the 3D object by:
indexing the target plane:
allocating the first indexing digit to each of the at least two cells resulting from the at least one first subdivision of the dimension of the object along the axis orthogonal to the target plane; and
allocating a $m^{th}$ subsequent indexing digit to the any subsequent at least two cells resulting from the any subsequent at least one subdivision of the at least one cell of the at least two cells resulting from the $m-1^{th}$ subdivision of the dimension of the object along the axis orthogonal to the target plane;
identifying that the plane intersects a cell if the indexing digits of the group corresponding to the axis orthogonal to the target plane of the index allocated to the cell are the same as the corresponding indexing digits allocated to the target plane.

8. The method of claim 7, wherein the 3D object is sliced into a plurality of 2D slices, a given slice being indexed by a pointer having a value in the range of the allocated indexing digits of the group corresponding to the axis orthogonal to the plane of the given 2D slice intersecting a first cell of the 3D object and the allocated indexing digits of the group corresponding to the axis orthogonal to the plane of the given 2D slice intersecting a last cell of the 3D object.

9. The apparatus of claim 8, wherein the processor is arranged to encode property data for each cell of the n-dimensional object; and the apparatus further comprises a store to store the property data of a given cell indexed by the allocated indexing digits of the given cell.

10. The method of claim 1, wherein the indexing digits allocated to encode a property form part of a binary indexing of the plurality of indexing digits for each axis of n dimensions of an n-dimensional object.

11. The method of claim 1, wherein the property includes a color, a rigidity, a flexibility, a conductivity, a magnetism, an opacity, a porosity of the at least two cells or combinations thereof.

12. A method for processing an n-dimensional object for printing, the method comprising:
subdividing at least one dimension of at least one axis of n dimensions of an n-dimensional object, where n is an integer greater than 1, to form at least two n-dimensional cells;
indexing each cell with a plurality of indexing digits to define its location within the n-dimensional object, the indexing comprising:
grouping a plurality of indexing digits for each axis;
allocating a first indexing digit of a given group to each of at least two cells resulting from at least one subdivision of the dimension of the object along the axis of the given group;
allocating an $m^{th}$ subsequent indexing digit of the given group to any subsequent at least two cells resulting from any subsequent at least one subdivision of at least one cell of the at least two cells resulting from the $m-1^{th}$ subdivision of the dimension of the object along the axis of the given group;
allocating an indexing digit within the plurality of indexing digits for each axis to encode a property associated with any of the at least two cells, wherein each cell has property data associated therewith and each undivided cell has uniform property data; and sorting groupings of the plurality of indexing digits by indexing digits of a first axis;

forming slices of an indexing digit space based on intersection with the first axis; and Providing the slices to an additive manufacturing machine to manufacture an object.

13. The method of claim 12, wherein the indexing digits allocated to encode a property form part of a binary indexing of the plurality of indexing digits for each axis of n dimensions of an n-dimensional object.

14. Apparatus for processing data representing an n-dimensional object, the apparatus comprising:

a divider, comprising a processor, to subdivide at least one dimension of at least one axis of n dimensions of an n-dimensional object, where n is an integer greater than 1, to form at least two n-dimensional cells;

an indexer comprising the processor to:

index each cell with a plurality of indexing digits to define its location within the n-dimensional object, by grouping a plurality of indexing digits for each axis;

allocate a first indexing digit of a given group to each of at least two cells resulting from at least one subdivision of the dimension of the object along the axis of the given group;

allocate an $m^{th}$ subsequent indexing digit of the given group to any subsequent at least two cells resulting from any subsequent at least one subdivision of at least one cell of the at least two cells resulting from a $m-1^{th}$ subdivision of the dimension of the object along the axis of the given group;

allocate an indexing digit within the plurality of indexing digits for each axis of n dimensions of an n-dimensional object to encode a property associated with any of the at least two cells, wherein each cell has property data associated therewith and no two cells of a subdivision have a same property data associated therewith a receiver, comprising the processor, to receive a representation of a 3D object to be processed; and group the plurality of indexing digits for each of three orthogonal axes of three dimensions of a 3D object, wherein the plurality of indexing digits are sorted by a first orthogonal axis;

an intersection detector, comprising the processor, to identify intersection of a target plane and at least one cell of the 3D object by allocating, the first indexing digit to each of the at least two cells resulting from the at least one first subdivision of the a dimension of the object along the axis orthogonal to the target plane; allocating a $m^{th}$ subsequent indexing digit of to the any subsequent at least two cells resulting from the any subsequent at least one subdivision of the at least one cell of the at least two cells resulting from the $m-1^{th}$ subdivision of the dimension of the object along an axis orthogonal to the target plane and identifying that the target plane intersects a cell if the indexing digits of the group corresponding to the axis orthogonal to the target plane of an index allocated to a cell are the same as corresponding indexing, digits allocated to the target plane;

a slicer, comprising the processor, to slice the representation of the 3D object into a plurality of 2D slices, a given slice being indexed by a pointer having a value in a range of allocated indexing digits of the group corresponding to the axis orthogonal to the plane of a given 2D slice intersecting a first cell of the 3D object and wherein allocated indexing digits of the group corresponding to the axis orthogonal to a plane of the given 2D slice intersecting a last cell of the 3D object; and the processor to further generate print control data to print each 2D slice to generate a 3D representation of the 3D object slice by slice based on property data of each intersecting cell of each slice.

15. The apparatus of claim 14, wherein the apparatus further comprises a store interface to arrange the property data to be store in the store in a predetermined order.

16. The apparatus of claim 14, wherein the indexing digits allocated to encode a property form part of a binary indexing of the plurality of indexing digits for each axis of n dimensions of an n-dimensional object.

17. The apparatus of claim 14, wherein the property includes a color, a rigidity, a flexibility, a conductivity, a magnetism, an opacity, a porosity of the at least two cells or combinations thereof.

* * * * *